(12) United States Patent
Musuvathy

(10) Patent No.: US 7,917,450 B1
(45) Date of Patent: Mar. 29, 2011

(54) INFORMATION TECHNOLOGY INTEGRATION COST ESTIMATOR

(75) Inventor: Vijaykumar Musuvathy, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 897 days.

(21) Appl. No.: 11/834,399

(22) Filed: Aug. 6, 2007

(51) Int. Cl.
*G06F 17/00* (2006.01)
*G06F 9/44* (2006.01)

(52) U.S. Cl. .................................................. 705/400

(58) Field of Classification Search ............ 705/7, 8, 705/9, 10, 11, 400, 1.1, 30, 35, 36 R; 370/238, 370/238.1, 235
See application file for complete search history.

(56) References Cited

U.S. PATENT DOCUMENTS

| 2004/0030563 A1* | 2/2004 | Porcari et al. ............... 705/1 |
| 2007/0016432 A1* | 1/2007 | Piggott et al. ............... 705/1 |
| 2007/0271128 A1* | 11/2007 | Terrence Bolling ............... 705/8 |

* cited by examiner

*Primary Examiner* — Igor Borissov

(57) ABSTRACT

A method is provided for estimating information technology integration costs. Capital data, staffing data, and integration goal data associated with a target enterprise are recorded. Capital data includes at least one of infrastructure data, computer data, network element data, and retail store data. Staffing data includes information technology staff data, employee data, and contractor data. Recorded data includes the capital data, the staffing data, and the integration goal data. A back office cost, a retail cost, an infrastructure cost, and a computer cost are estimated based on the recorded data associated with the target enterprise. The back office cost, the retail cost, the infrastructure cost and the computer cost are combined to produce an information technology integration cost. The information technology integration cost is output by an output device.

19 Claims, 4 Drawing Sheets

| Storage 202 | | |
|---|---|---|
| Integration Data 204 | First Target Enterprise 206 | Second Target Enterprise 208 |
| Network Elements 210 | 1 | 6 |
| Infrastructure 212 | 1 | 3 |
| Computers 214 | 84 (54) | 5900 |
| Retail Stores 216 | 8 | 130 |
| General Employees 218 | 84 | 10000 |
| IT Employees 220 | 0.5 | 29 |
| Integration Goals 222 | 90 days | 180 days |

IT Integration Cost Estimator 128

| Graphic User Interface 302 | | | | |
|---|---|---|---|---|
| First Target Enterprise 206 | | | | |
| Estimated Costs 304 | Capital Costs 316 | Expense Costs 318 | Recurring Costs 320 | Totaled Costs 322 |
| Back Office Costs 306 | $25,722 | $37,941 | $36,729 | $100,392 |
| Retail Costs 308 | $523,745 | $55,853 | $122,465 | $702,063 |
| Infrastructure Costs 310 | $0 | $41,500 | $0 | $41,500 |
| Computer Costs 312 | $30,420 | $0 | $0 | $30,420 |
| Total Costs 314 | $579,887 | $135,294 | $159,194 | $874,375 |

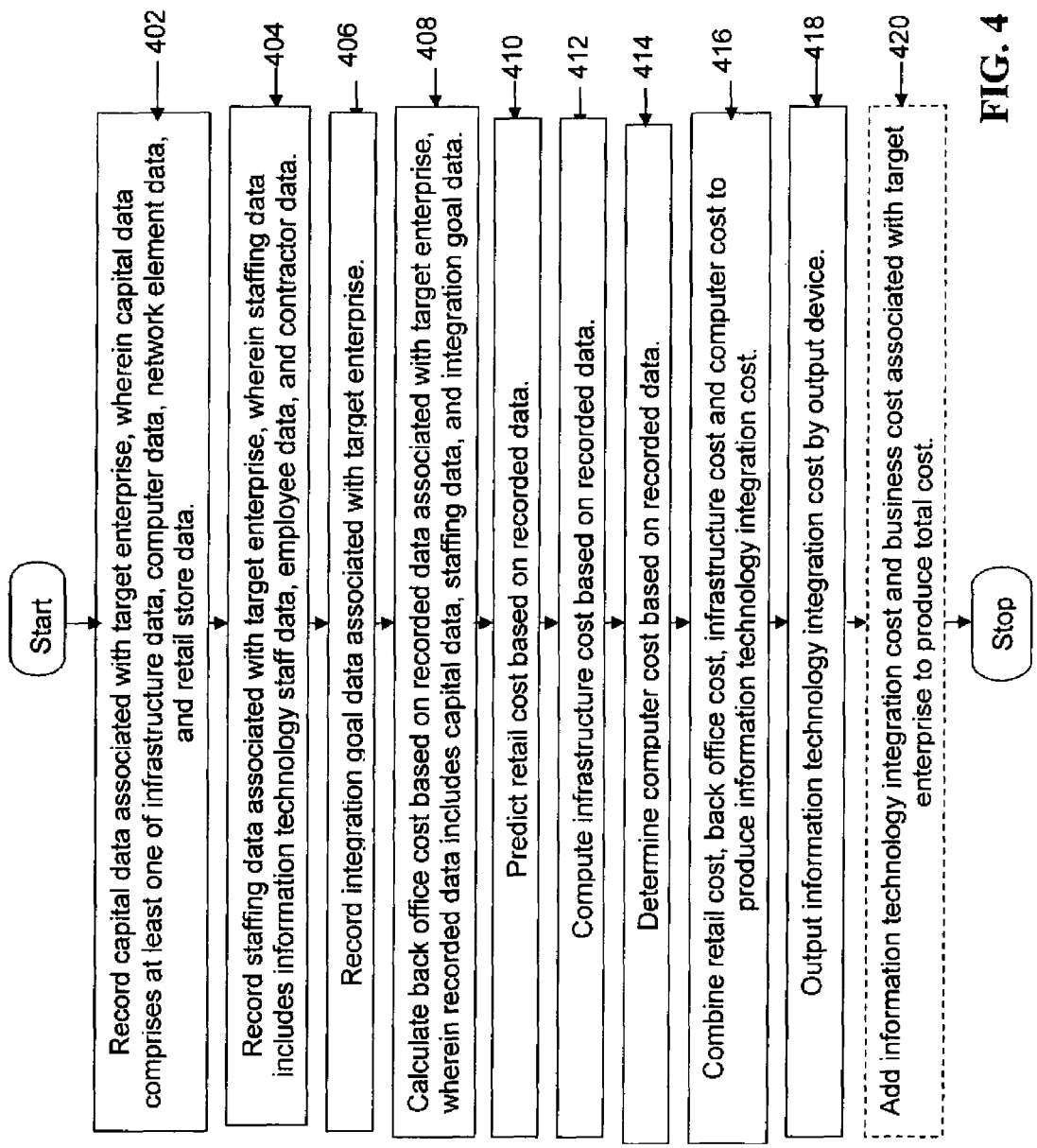

INFORMATION TECHNOLOGY INTEGRATION COST ESTIMATOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Businesses frequently merge, acquire other businesses, and are acquired. Before deciding whether to merge with or acquire a target business or enterprise, a potential purchaser evaluates a target enterprise through a due diligence process that focuses on business aspects of the proposed transaction, such as potential growth, customer base, the purchase of assets, and the assumption of debts. However, integration costs that are not properly evaluated may determine whether a merger or acquisition is ultimately beneficial for the purchaser.

SUMMARY OF THE INVENTION

In one embodiment, the present disclosure provides a method for estimating information technology integration costs. Capital data, staffing data, and integration goal data associated with a target enterprise are recorded. Capital data includes at least one of infrastructure data, computer data, network element data, and retail store data. Staffing data includes information technology staff data, employee data, and contractor data. A back office cost, a retail cost, an infrastructure cost, and a computer cost are estimated based on the recorded data. The back office cost, the retail cost, the infrastructure cost and the computer cost are combined to produce an information technology integration cost. The information technology integration cost is output by an output device.

In another embodiment, a system for estimating information technology integration costs is provided. The system includes a storage device, a processor, an input-output device, and instructions stored in the storage device. The input-output device records data, including capital data, staffing data, and integration goal data associated with a target enterprise. Capital data includes at least one of infrastructure data, computer data, network element data, and retail store data. Staffing data includes information technology staff data, employee data, and contractor data. When executed by the processor, the instructions estimate a back office cost, a retail cost, an infrastructure cost, and a computer cost based on the recorded data. When executed by the processor, the instructions also combine the back office cost, the retail cost, the infrastructure cost and the computer cost to produce an information technology integration cost. The input-output device outputs the information technology integration cost.

In other embodiments, a method is provided for estimating information technology integration costs. Capital data, staffing data, and integration goal data associated with a target enterprise are recorded. Capital data includes at least one of infrastructure data, computer data, network element data, and retail store data. Staffing data includes information technology staff data, employee data, and contractor data. A capital cost, an expense cost, and a recurring cost are estimated based on the recorded data. The capital cost, the expense cost, and the recurring cost are combined to produce an information technology integration cost. The information technology integration cost is output by an output device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a block diagram of information technology integration cost estimator data according to some embodiments of the present disclosure.

FIG. 3 is a block diagram of a graphic user interface for an information technology integration cost estimator according to some embodiments of the present disclosure.

FIG. 4 is a flowchart of a method that might be used to estimate an information technology integration cost according to some embodiments of the present disclosure.

DETAILED DESCRIPTION OF THE PREFERRED EMBODIMENTS

Figure 1:
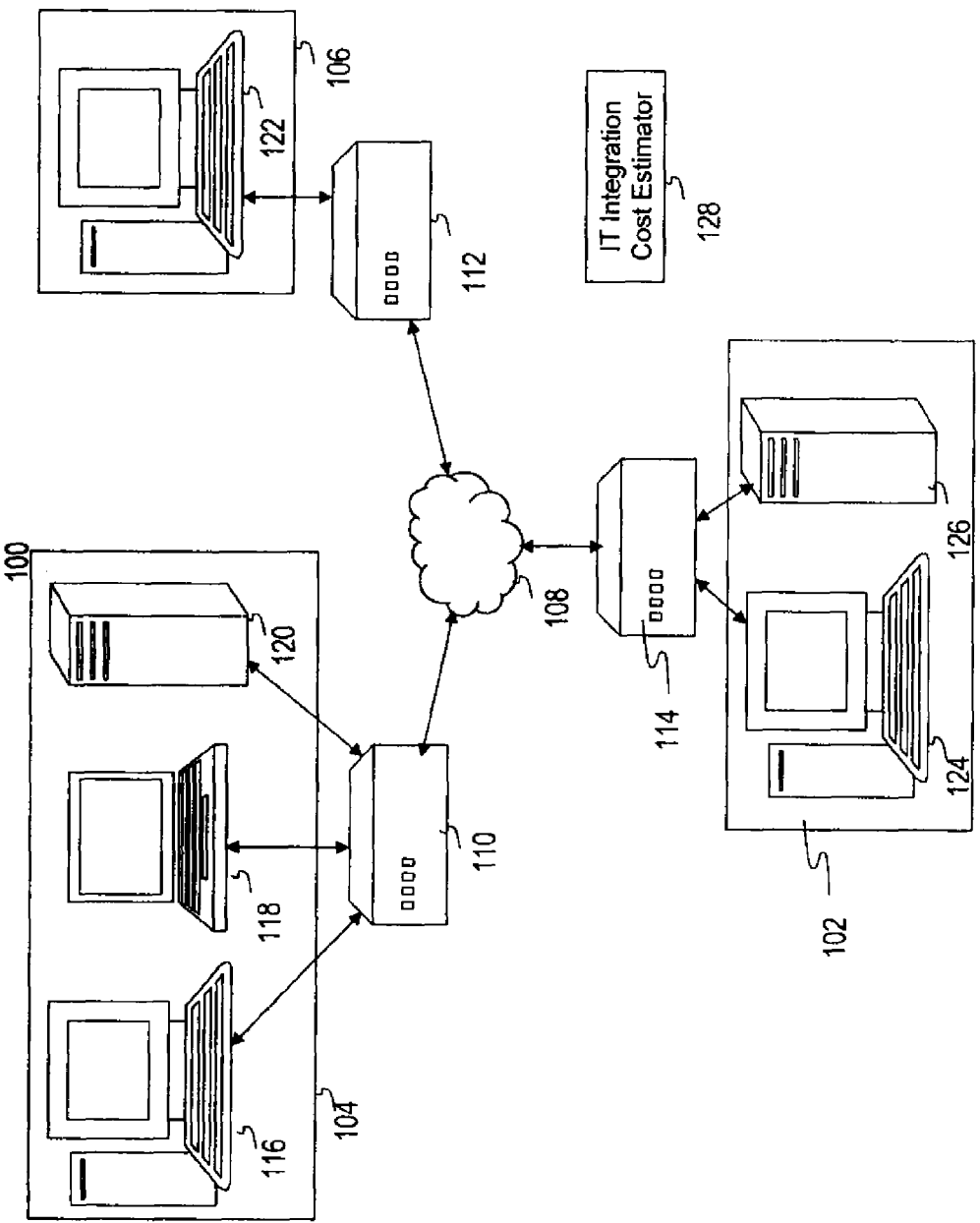
FIG. 1 is a diagram of an exemplary information technology system for a target enterprise according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various methods and systems for estimating information technology integration costs. Before beginning an expensive due diligence process, a prospective purchaser can use data that is often publicly available to determine the information technology integration costs required for a merger or an acquisition. These information technology integration costs can be a factor used in determining whether the merger or acquisition is likely to be beneficial for the purchaser. Information technology integration costs are the expenses required to merge the existing and target information technology systems into the information technology system of the resulting enterprise. An information technology integration cost estimator records data that has been identified by regression analysis of historical data as useful data for estimating information technology integration costs. The regression analysis examines data from prior acquisitions and mergers to determine which pre-integration statistics are correlated with the final integration expenses.

The data examined by regression analysis may include network elements, infrastructure components, computers, retail stores, general employees, IT employees, and integration goals.

The identified data includes capital data, staffing data, and integration goal data associated with a target enterprise. Capital data includes at least one of infrastructure data, computer data, network element data, and retail store data. Staffing data includes information technology staff data, employee data, and contractor data. The information technology integration cost estimator estimates a back office cost, a retail cost, an infrastructure cost, and a computer cost based on the recorded data for these identified factors. In some embodiments, the information technology integration cost estimator estimates a capital cost, an expense cost, and a recurring cost as cost components for each of the back office cost, the retail cost, the infrastructure cost, and the computer cost. The information technology integration cost estimator combines the back office cost, the retail cost, the infrastructure cost and the computer cost to produce an information technology integration cost. An output device outputs the information technology integration cost to a user to be used as a factor in the determination whether the merger or acquisition is likely to be beneficial for the purchaser.

If regression analysis of historical data identifies additional factors that are useful in estimating IT integration costs, the IT integration cost estimator 128 can incorporate these additional factors into its computations. Likewise, if regression analysis of historical data determines that previously identified factors are no longer useful in estimating IT integration costs, the IT integration cost estimator 128 can delete these previously identified factors from its computations and add other more significant factors.

Turning now to FIG. 1, an exemplary information technology system 100 for a target enterprise that may be evaluated by an information technology cost estimator is depicted according to embodiments of the present disclosure. A target enterprise may be a target for either a merger or an acquisition, and may have retail locations that include information technology components. The system 100 depicts a target enterprise that includes a back office 102, a first retail store 104 and a second retail store 106. The back office 102 communicates with the first retail store 104 and the second retail store 106 via a network 108. The back office 102 may be an information technology support system of the target enterprise. The first retail store 104 uses a first network element 110, such as a router, to communicate with the network 108. Similarly, the second retail store 106 uses a second network element 112 to communicate with the network 108, and the back office 102 uses a third network element 114 to communicate with the network 108. The first retail store 104 includes a first desktop computer 116, a first laptop computer 118, and a first server 120. The second retail store 106 includes a second desktop computer 122. The back office 102 includes a third desktop computer 124 and a second server 126.

Embodiments of the present disclosure provide an Information Technology (IT) integration cost estimator 128 that records data associated with the target enterprise, such as data associated with the system 100, and estimates an information technology integration cost based on the recorded data. The IT integration cost estimator 128 can be a software tool that prompts users to input data into a graphic user interface. The IT integration cost estimator 128 may be implemented as a software program, or a spreadsheet, or other system. The number and the types of sites, networks, network elements, computers, and servers in FIG. 1 are exemplary of the IT components of a business that might be the subject of a merger or acquisition. The IT integration cost estimator 128 can record data for any number and types of sites, networks, network elements, computers, servers, infrastructure components, gateways, firewalls, and data for employees, information technology employees, and contractors.

Turning now to FIG. 2, data for an information technology integration cost estimator is depicted according to some embodiments of the present disclosure. The IT integration cost estimator 128 records data in storage 202, where the recorded data includes integration data 204 associated with target enterprises, such as a first target enterprise 206 and a second target enterprise 208. The first target enterprise 206 and the second target enterprise 208 may be two different enterprises that are being considered for acquisition or merger. The integration data 204 is the historical data identified as useful data for estimating information technology integration costs based on regression analysis of historical or previous information technology system integrations. The integration data 204 can be information provided by the target enterprise, publicly available information, or information produced by or provided to the potential purchaser. The integration data 204 includes network elements 210, infrastructure 212 components, computers 214, retail stores 216, general employees 218, IT employees 220, and integration goals 222 for each target enterprise.

The network elements 210 is the number of routers, switches, and similar information technology infrastructure components associated with a target enterprise. Each router and switch needs to be verified as compatible with the new integrated system, converted to be compatible with the new integrated system, replaced, and/or supplemented by additional routers and switches in the integrated system. The infrastructure 212 components is the number of the servers, firewalls, gateways, and similar computing infrastructure components associated with a target enterprise. Each server, gateway, and firewall needs to be verified as compatible with the new integrated system, converted to be compatible with the new integrated system, replaced, and/or supplemented by additional servers, firewalls, and gateways in the integrated system.

The computers 214 is the number of the desktop computers, laptop computers, software applications, and similar computers and software associated with a target enterprise. Each desktop computer, laptop computer, and software application needs to be verified as compatible with the new integrated system, converted to be compatible with the new integrated system, replaced, and/or supplemented by additional desktop computers, laptop computers, and software applications in the integrated system. The computers 214 can be categorized as retail computers and non-retail computers. The retail stores 216 is the number of the retail outlets associated with a target enterprise.

The general employees 218 is the number of the employees and the contractors associated with a target enterprise. The number of the employees and the contractors is useful for estimating information technology integration costs because each employee and contractor needs to be trained to use the new integrated information technology system. The IT employees 220 is the number of the information technology employees and the information technology contractors associated with a target enterprise. The number of the information technology employees and the information technology contractors may be useful for estimating integration costs because each information technology employee and information technology contractor can assist with the integration process.

The integration goals 222 is the measure of information technology integration expectations, such as standards for the integrated information technology system to meet, and an information technology integration duration, such as the length of time allocated for the information technology system integration. The standards for the integrated information technology system to meet can include a customer response time, such as 5 to 10 days to service a customer order. If the standard for the integrated information technology system is significantly higher than the standard provided by the target enterprise, the costs are greater for integration to achieve the higher standard. A short information technology integration duration increases costs by increasing the hours that employees and contractors must work during the short duration to integrate the target enterprise. Conversely, a longer information technology integration duration increases maintenance costs for maintaining the existing information technology system during the integration.

In the example depicted in FIG. 2, the first target enterprise 206 includes 1 network element 210, 1 infrastructure 212 component, 84 computers 214 with 54 computers identified as retail computers, 8 retail stores 216, 84 general employees 218, 0.5 IT employees 220, and integration goals 222 of 90 days for an information technology integration duration. In contrast, the second target enterprise 208 includes 6 network elements 210, 3 infrastructure 212 components, 5900 computers 214, 130 retail stores 216, 10000 general employees 218, 29 IT employees 220, and integration goals 222 of 180 days for an information technology integration duration. In this example, the numbers entered in the integration data 204 for the enterprises indicates that the first target enterprise 206 may be a smaller enterprise than the second target enterprise 208.

Turning now to FIG. 3, a graphic user interface (GUI) 302 for an information technology integration cost estimator is depicted according to some embodiments of the present disclosure. The GUI 302 might contain selectable boxes or similar components corresponding to the data depicted in FIG. 2. A user might manually enter the selection of a target enterprise name to select the display on the GUI 302 of IT integration costs calculated by the IT integration cost estimator for the target enterprise, such as IT integration costs based on the integration data 204. Alternatively, the boxes might contain drop-down lists or similar components that allow a user to select target enterprises and associated data from predefined lists. The GUI 302 might contain a component that automatically calculates data associated with a target enterprise using the target enterprise entered or selected by the user. Alternatively, a text-based data entry system might be used for entry of a target enterprise. An automated calculation system might again be present to calculate associated data based on the target enterprise entered.

For example, the graphic user interface 302 displays data associated with the first target enterprise 206. The data associated with the first target enterprise 206 lists estimated costs 304 based on the data recorded in FIG. 2. The estimated costs 304 includes the back office costs 306, the retail costs 308, the infrastructure costs 310, the computer costs 312, and the total costs 314. The back office costs 306 are the costs required to integrate the back office of the target enterprise. The retail costs 308 are the costs required to integrate the retail stores of the target enterprise. The infrastructure costs 310 are the costs required to purchase, replace, or convert information technology infrastructure components during integration of the target enterprise. The computer costs 312 are the costs required to purchase, convert, or replace computers during integration of the target enterprise. The total costs 314 is the total of the back office costs 306, the retail costs 308, the infrastructure costs 310, the computer costs 312.

Each of the costs 306-314 are composed of capital costs 316, expense costs 318, recurring costs 320. The capital costs 316 are costs associated with items that have ordinarily been purchased by the target enterprise, such as purchased computers and purchased retail stores. The expense costs 318 are costs associated with non-capital items, such as contractor costs for a specific project. The recurring costs 320 are costs associated with ongoing expenses, such as leased computers and leased retail stores. The costs 316-320 are totaled and displayed as totaled costs 322. For example, based on the integration data 204 for the first target enterprise 206, the IT integration cost estimator 128 estimates that the capital costs 316 of the back office costs 306 for the first target enterprise 206 is $25,722.

The capital costs 316 of the back office costs 306 is $25,722, which is based on the combined estimates of $16,000 for data switches and $9,722 for voice sites. The $16,000 for data switches is based on $8,000 for 1 network element 210 and $8,000 for 1 infrastructure component. The $9,722 for voice sites is based on $50,000 voice over internet protocol multiplied by the product of 1 network element 210 and 84 general employees 218, and subsequently divided by the product of 8 retail stores multiplied by 54 retail computers 214.

The expense costs 318 of the back office costs 306 is $37,941, which is based on the combined estimates of $36,000 for T1 connectivity, $1,741 for data switches, and $200 for travel costs. The $36,000 for T1 connectivity is based on $18,000 for 1 network element 210 and $18,000 for 1 infrastructure component. The $1,741 for data switches is based on $870.50 for 1 network element 210 and $870.50 for 1 infrastructure component. The $200 for travel costs is based on $100 travel expenses estimated for a technician to configure T1 connectivity for each data switch.

The recurring costs 320 of the back office costs 306 is $36,729, which is based on the combined estimates of $36,000 for T1 connectivity, and $729 for data switches. The $36,000 for T1 connectivity is based on $18,000 for 1 network element 210 and $18,000 for 1 infrastructure component. The $729 for data switches is based on $364.50 for 1 network element 210 and $364.50 for 1 infrastructure component.

Because the capital costs 316 of the back office costs 306 is $25,722, the expense costs 318 of the back office costs 306 is $37,941, and the recurring costs 320 of the back office costs 306 is $36,729, the totaled costs 322 of the back office costs 306 is $100,392.

The capital costs 316 of the retail costs 308 is $523,745 which is based on the combined estimates of $290,752 for retail desktop data network, $166,856 for retail data network, $54,137 for retail voice network, and $12,000 for retail travel. The $290,752 for retail desktop data network is based on $36,344 for 8 retail stores 216. The $166,856 for retail data network is based on $20,857 per data network element for 8 retail stores 216. The $54,137 for retail voice network is based on $6,767.20 per voice router for 8 retail stores 216. The $12,000 for retail travel is based on $1,500 for a technician to travel to 8 retail stores 216.

The expense costs 318 of the retail costs 308 is $55,853, which is based on the combined estimates of $9,936 for retail desktop data network, $13,729 for retail data network, $27,864 for retail voice network, and $4,323 for maintenance. The $9,936 for retail desktop data network is based on $1,242 for 8 retail stores 216. The $13,729 for retail data network is based on $908.59 of network costs multiplied by 8 retail stores 216 and multiplied by a scaling factor. The scaling factor equals the sum of 84 general employees 218 and 1 network element 210, subsequently divided by the product of 0.5 IT employees 220 multiplied by 90 days integration goals 222. The $27,864 for retail voice network is based on $19.35 of vendor hour costs multiplied by 8 retail stores 216, multiplied by 90 days integration goals 222, and divided by 0.5 IT employees 220. The $4,323 for maintenance is based on $540.48 for profiles and installs at 8 retail stores 216.

The recurring costs 320 of the retail costs 308 is $122,465, which is based on the combined estimates of $1,832 for retail desktop data network, $87,224 for retail data network, and $33,408 for retail voice network. The $1,832 for retail desktop data network is based on $229 for 8 retail stores 216. The $87,224 for retail data network is based on $10,903 annual T1 costs for 8 retail stores 216. The $33,408 for retail voice network is based on $4,176 annual local exchange carrier charges for 8 retail stores 216.

Because the capital costs 316 of the retail costs 308 is $523,745, the expense costs 318 of the retail costs 308 is $55,853, and the recurring costs 320 of the retail costs 308 is $122,465, the totaled costs 322 of the retail costs 308 retail costs 308 is $702,063.

The expense costs 318 of $41,500 is based on $40,00 of potential labor cost and an additional $1,500 of travel costs required for the information technology integration. Because the capital costs 316 of the infrastructure costs 310 is $0, the expense costs 318 of the infrastructure costs 310 is $41,500, and the recurring costs 320 of the infrastructure costs 310 is $0, the totaled costs 322 of the infrastructure costs 310 is $41,500.

The capital costs 316 of $30,420 is based on a $1,014 cost for a laptop with docking for each of the 30 non-retail computers 214. Because the capital costs 316 of the computer costs 312 is $30,420, the expense costs 318 of the computer costs 312 is $0, and the recurring costs 320 of the computer costs 312 is $0, the totaled costs 322 of the computer costs 312 is $30,420.

Because the capital costs 316 of the back office costs 306 is $25,722, the capital costs 316 of the retails costs 308 is $523,745, the capital costs 316 of the infrastructure costs 310 is $0, and the capital costs 316 of the computer costs 312 is $30,420, the total costs 314 of the capital costs 316 is $579,887. The expense costs 318, the recurring costs 320, and the totaled costs 322 are totaled in the total costs 314 row similar to the manner in which the capital costs 316 were totaled in the total costs 314 row. The total costs 314 of the totaled costs 322 is $874,375, which is the information technology integration costs estimate for the first target enterprise 206.

The computations in FIG. 3 are depicted for the purposes of an example only, as the numbers computed could be based on different integration data 204 numbers, different factors, and different results from regression analysis of historical data. For example, regression analysis of historical data can identify an increase in specific expenses. In response, the IT integration cost estimator 128 can modify the factor that multiplies the number of data switches by $870.50 to compute expense costs 318 of the back office costs 306 to a factor that multiplies the number of data switches by $900. In another example, a user of the IT integration cost estimator 128 can modify the factor that multiplies the number of data switches by $364.50 to compute recurring costs 320 of the back office costs 306 to a factor that multiplies the number of data switches by $350. The user of the IT integration cost estimator 128 can also modify the numbers entered for the network elements 210 and the infrastructure 212.

An illustrative method for estimating information technology integration costs is depicted in FIG. 4. The IT integration cost estimator 128 can execute the method to estimate information technology integration costs for a target enterprise.

In box 402, the IT integration cost estimator 128 records capital data associated with a target enterprise wherein capital data comprises at least one of infrastructure data, computer data, network element data, and retail store data. Capital data is the data for tangible items that are ordinarily purchased by the target enterprise, including items such as purchased computers, and purchased retail stores. However, the capital data can include data for items that are actually leased by the target enterprise, such as leased retail stores and leased computers. For example, the IT integration cost estimator 128 records 1 network element 210, 1 infrastructure 212 component, 84 computers 214, and 8 retail stores 216 associated with the first target enterprise 206.

In box 404, the IT integration cost estimator 128 records staffing data associated with the target enterprise, wherein staffing data includes information technology staff data, employee data, and contractor data. Staffing data is the data for employees and contractors, both general and IT, associated with the target enterprise. For example, IT integration cost estimator 128 records 84 general employees 218 and 0.5 IT employees 220 associated with the first target enterprise 206.

In box 406, the IT integration cost estimator 128 records integration goals data associated with the target enterprise. For example, the IT integration cost estimator 128 records the 90 days of integration duration as the integration goals data 222 associated with the first target enterprise 206.

In box 408, the IT integration cost estimator 128 calculates a back office cost based on the recorded data associated with the target enterprise, wherein the recorded data includes the capital data, the staffing data, and the integration goal data. For example, the IT integration cost estimator 128 calculates the back office costs 306 of $100,392 from the capital costs 316 of $25,722, the expense costs 318 of $37,941, and the recurring costs 320 of $36,729 based on the recorded data associated with the first target enterprise 206.

In box 410, the IT integration cost estimator 128 predicts a retail cost based on recorded data. For example, the IT integration cost estimator 128 predicts the retail costs 308 of $702,063 from the capital costs 316 of $523,745, the expense costs 318 of $44,853, and the recurring costs 320 of $122,465 based on the recorded data associated with the first target enterprise 206.

In box 412, the IT integration cost estimator 128 computes an infrastructure cost based on the recorded data. For example, the IT integration cost estimator 128 computes the infrastructure costs 310 of $41,500 from the capital costs 316 of $0, the expense costs 318 of $41,500, and the recurring costs 320 of $0 based on the recorded data associated with the first target enterprise 206.

In box 414, the IT integration cost estimator 128 determines a computer cost based on the recorded data. For example, the IT integration cost estimator 128 determines the computer costs 312 of $30,420 from the capital costs 316 of $30,420, the expense costs 318 of $0, and the recurring costs 320 of $0 based on the recorded data associated with the first target enterprise 206.

In box 416, the IT integration cost estimator 128 combines the back office cost, the retail cost, the infrastructure cost and the computer cost to produce an information technology integration cost. For example, the IT integration cost estimator 128 combines the back office costs 306 of $100,392, the retail cost 308 of $702,063, the infrastructure costs 310 of $41,500 and the computer costs 312 of $30,420 to produce the total costs 314 of $874,375 as the information technology integration cost.

In box 418, an output device outputs the information technology integration cost. For example, the graphic user interface 302 outputs the information technology integration cost of $874,375 for the first target enterprise 206.

In box 420, the IT integration cost estimator 128 optionally adds the information technology integration cost and a business cost associated with the target enterprise to produce a total cost. For example, in some embodiments the IT integration cost estimator 128 combines the information technology integration cost of $874,375 with a business cost, such as other non-IT related integration costs, to use in the merger and acquisition analysis.

Figure 5:
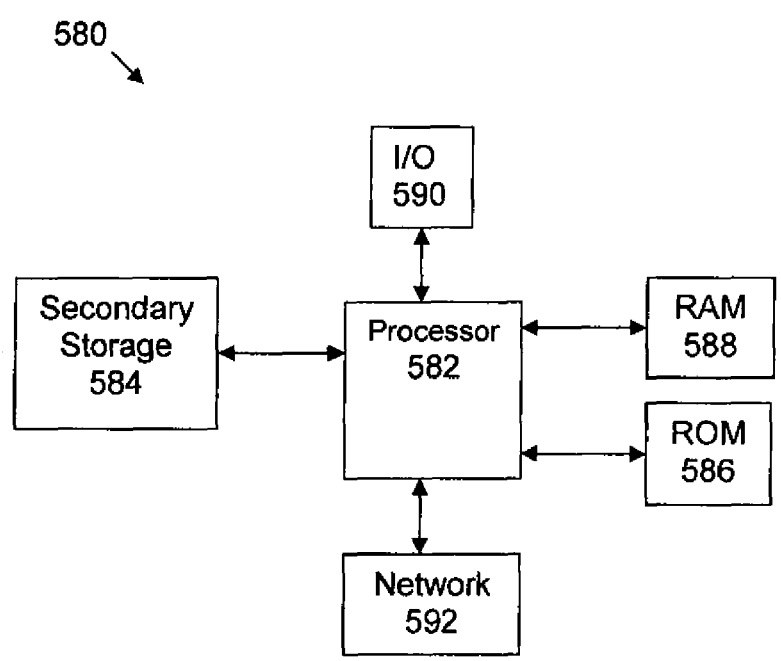
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for estimating information technology integration costs, comprising:

recording capital data associated with a target enterprise, wherein the capital data comprises an infrastructure data, computer data, network element data, and retail store data;

recording staffing data associated with the target enterprise, wherein the staffing data includes information technology staff data, employee data, and contractor data;

recording integration goal data associated with the target enterprise;

calculating, by a computer, a back office cost based on recorded data associated with the target enterprise, wherein the recorded data comprises the capital data, the staffing data, and the integration goal data, wherein the back office cost comprises a capital cost that is based on a data switches cost estimate and a voice sites cost estimate, wherein the voice sites cost estimate is based on a voice over internet protocol factor multiplied by a product of a number of network elements and a number of general employees, and subsequently divided by a product of a number of retail stores multiplied by a number of retail computers;

predicting, by a computer, a retail cost based on the recorded data;

computing, by a computer, an infrastructure cost based on the recorded data;

determining, by a computer, a computer cost based on the recorded data;

combining the back office cost, the retail cost, the infrastructure cost and the computer cost to produce an information technology integration cost; and outputting the information technology integration cost by an output device.

2. The computer implemented method of claim 1, further comprising:

adding the information technology integration cost and a business cost associated with the target enterprise to produce a total cost.

3. The computer implemented method of claim 1, wherein the infrastructure data comprises at least one of server data, gateway data, and firewall data.

4. The computer implemented method of claim 1, wherein the computer data comprises at least one of desktop data, laptop data, and software application data.

5. The computer implemented method of claim 1, wherein the integration goal data comprises at least one of integration duration data and integration expectations data.

6. The computer implemented method of claim 1, wherein the back office cost further comprises at least one of: an expense cost, and a recurring cost.

7. The computer implemented method of claim 1, wherein the retail cost comprises at least one of a capital cost, an expense cost, and a recurring cost.

8. The computer implemented method of claim 7, wherein the expense cost is based on a retail desktop data network cost estimate, a retail data network cost estimate, a retail voice network cost estimate, and a maintenance cost estimate, wherein the retail data network cost estimate is based on a network cost estimate multiplied by a number of retail stores and multiplied by a scaling factor, wherein the scaling factor equals the sum of a number of general employees and a number of network elements, subsequently divided by a product of a number of information technology employees multiplied by a number of days for integration.

9. The computer implemented method of claim 7, wherein the expense cost is based on a retail desktop data network cost estimate, a retail data network cost estimate, a retail voice network cost estimate, and a maintenance cost estimate, wherein the retail voice network cost estimate is based on a vendor hour cost estimate multiplied by a number of retail stores, multiplied by a number of days for integration, and divided by a number of information technology employees.

10. The computer implemented method of claim 1, wherein the infrastructure cost comprises at least one of a capital cost, an expense cost, and a recurring cost.

11. The computer implemented method of claim 1, wherein the computer cost comprises at least one of a capital cost, an expense cost, and a recurring cost.

12. The computer implemented method of claim 1, further comprising using historical data as the basis for at least one of calculating a back office cost, predicting a retail cost, computing an infrastructure cost, and determining a computer cost.

13. A system for estimating information technology integration costs, comprising:

a storage device;

a processor configured to record data in the storage device, including capital data associated with a target enterprise, wherein the capital data comprises an infrastructure data, computer data, network element data, retail store data, and staffing data associated with the target enterprise, wherein the staffing data includes information technology staff data, employee data, and contractor data, and integration goal data associated with the target enterprise;

instructions stored in the storage device, such that the instructions when executed by the processor are operable to:

calculate a back office cost based on recorded data associated with the target enterprise, wherein the recorded data comprises the capital data, the staffing data, and the integration goal data;

predict a retail cost based on the recorded data;

compute an infrastructure cost based on the recorded data;

determine a computer cost based on the recorded data; and combine the back office cost, the retail cost, the infrastructure cost, and the computer cost to produce an information technology integration cost, wherein the retail cost comprises a capital cost, an expense cost, and a recurring cost, wherein the expense cost is based on a retail desktop data network cost estimate, a retail data network cost estimate, a retail voice network cost estimate, and a maintenance cost estimate, wherein the retail data network cost estimate is based on a network cost estimate multiplied by a number of retail stores and multiplied by a scaling factor, wherein the scaling factor equals the sum of a number of general employees and a number of network elements, subsequently divided by a product of a number of information technology employees multiplied by a number of days for integration; and an input-output device operable to output the information technology integration cost.

14. The system of claim 13, wherein the instructions when executed by the processor are further operable to add the information technology integration cost and a business cost associated with the target enterprise to produce a total cost.

15. A computer implemented method for estimating information technology integration costs, comprising:

recording capital data associated with a target enterprise, wherein the capital data comprises at least one of infrastructure data, computer data, network element data, and retail store data;

recording staffing data associated with the target enterprise, wherein the staffing data includes information technology staff data, employee data, and contractor data;

recording integration goal data associated with the target enterprise;

calculating, by a computer, a capital cost based on recorded data associated with the target enterprise, wherein the recorded data comprises the capital data, the staffing data, and the integration goal data;

predicting, by a computer, an expense cost based on the recorded data, wherein the expense cost comprises a retail expense cost, wherein the retail expense cost is based on a retail desktop data network cost estimate, a retail data network cost estimate, a retail voice network cost estimate, and a maintenance cost estimate, wherein the retail voice network cost estimate is based on a vendor hour cost estimate multiplied by a number of retail stores, multiplied by a number of days for integration, and divided by a number of information technology employees;

computing, by a computer, a recurring cost based on the recorded data;

combining the capital cost, the expense cost, and the recurring cost to produce an information technology integration cost; and outputting the information technology integration cost by an output device.

16. The computer implemented method of 15, further comprising adding the information technology integration cost and a business cost associated with the target enterprise to produce a total cost.

17. The computer implemented method of claim 15, wherein the capital cost comprises at least one of a back office cost, a retail cost, an infrastructure cost, and a computer cost.

18. The computer implemented method of claim 15, wherein the expense cost further comprises at least one of a back office cost, an infrastructure cost, and a computer cost.

19. The computer implemented method of claim 15, wherein the recurring cost comprises at least one of a back office cost, a retail cost, an infrastructure cost, and a computer cost.

* * * * *